United States Patent
Stransky-Heilkron

(10) Patent No.: US 12,316,889 B2
(45) Date of Patent: *May 27, 2025

(54) METHOD TO INSERT AD CONTENT INTO A VIDEO SCENE

(71) Applicant: NAGRAVISION SÀRL, Cheseaux-sur-Lausanne (CH)

(72) Inventor: Philippe Stransky-Heilkron, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/493,834

(22) Filed: Oct. 25, 2023

(65) Prior Publication Data

US 2024/0080506 A1   Mar. 7, 2024

Related U.S. Application Data

(63) Continuation of application No. 17/893,213, filed on Aug. 23, 2022, now Pat. No. 11,856,244, which is a (Continued)

(30) Foreign Application Priority Data

Jul. 7, 2017   (EP) .................................. 17180263

(51) Int. Cl.
| | |
|---|---|
| *H04N 21/23* | (2011.01) |
| *H04N 5/272* | (2006.01) |
| *H04N 21/234* | (2011.01) |
| *H04N 21/2343* | (2011.01) |
| *H04N 21/258* | (2011.01) |
| *H04N 21/2668* | (2011.01) |
| *H04N 21/431* | (2011.01) |
| *H04N 21/433* | (2011.01) |

(Continued)

(52) U.S. Cl.
CPC ..... *H04N 21/23424* (2013.01); *H04N 5/2723* (2013.01); *H04N 21/23418* (2013.01); *H04N 21/2343* (2013.01); *H04N 21/234345* (2013.01); *H04N 21/25891* (2013.01); *H04N 21/2668* (2013.01); *H04N 21/4316* (2013.01); *H04N 21/4334* (2013.01); *H04N 21/44008* (2013.01); *H04N 21/440245* (2013.01); *H04N 21/4622* (2013.01); *H04N 21/812* (2013.01)

(58) Field of Classification Search
None
See application file for complete search history.

(56) References Cited

U.S. PATENT DOCUMENTS

2003/0028873 A1*   2/2003   Lemmons ........ H04N 21/23418
                                                     348/588
2016/0212455 A1*   7/2016   Manna .................. G06Q 30/02

* cited by examiner

*Primary Examiner* — Cai Y Chen
(74) *Attorney, Agent, or Firm* — POLSINELLI LLP

(57) ABSTRACT

A post-processing of video content in order to provide a capability to insert ad content, having a method to produce a modified video content from an original video content. The method comprising: analyzing the original video content to detect at least one marker, said marker comprising a marker surface delimited by a marker identification; loading profile data of a target user; determining, based at least on the profile data a replacement content; adjusting the replacement content into the marker surface; and replacing into the original video content the marker surface by the adjusted replacement content to produce the modified video content.

14 Claims, 5 Drawing Sheets

Related U.S. Application Data continuation of application No. 16/820,980, filed on Mar. 17, 2020, now Pat. No. 11,457,248, which is a continuation of application No. 16/025,542, filed on Jul. 2, 2018, now Pat. No. 10,631,022.

(51) Int. Cl.
*H04N 21/44* (2011.01)
*H04N 21/4402* (2011.01)
*H04N 21/462* (2011.01)
*H04N 21/81* (2011.01)

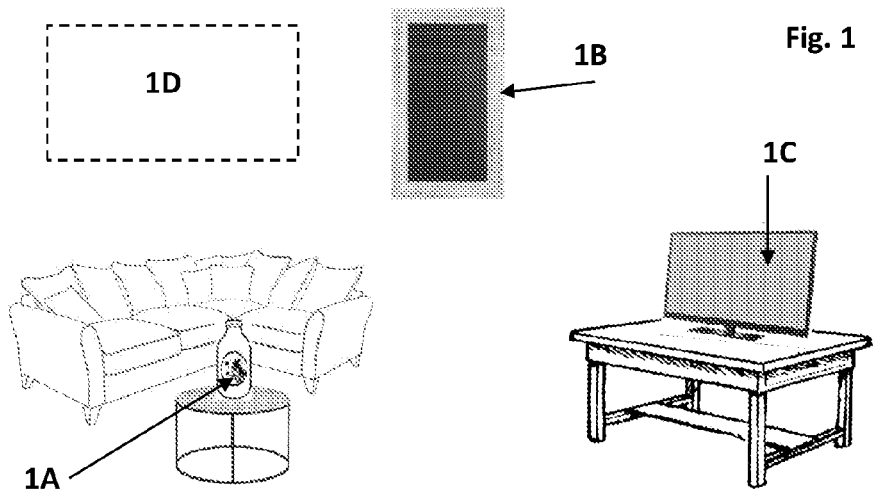
Fig. 1
Fig. 2
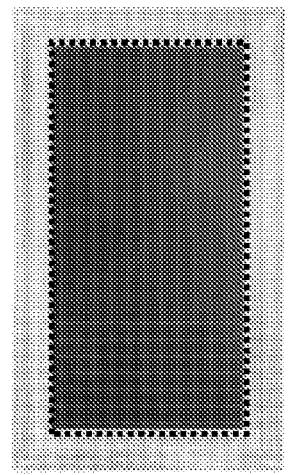
Fig. 3A
Fig. 3B
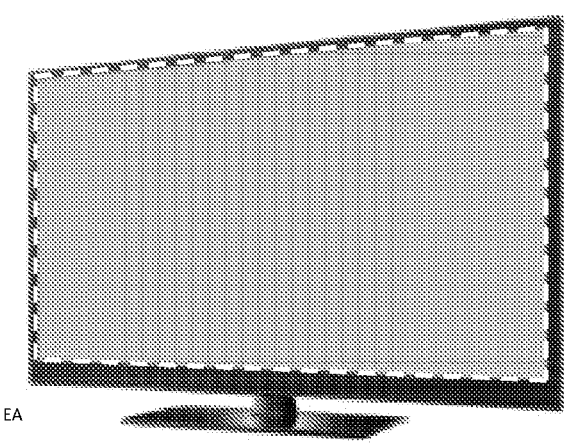
Fig. 4
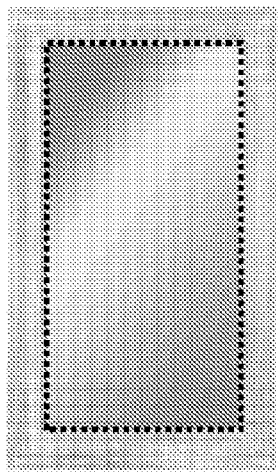

METHOD TO INSERT AD CONTENT INTO A VIDEO SCENE

CROSS REFERENCE TO RELATED APPLICATIONS

This application claims priority from European Patent Application No. 17180263.0 filed Jul. 7, 2017, the contents of which is hereby incorporated by reference herein in its entirety.

INTRODUCTION

The present disclosure refers to the post-processing of video content in order to provide a capability to insert ad content.

BACKGROUND

In known solutions, a video content is edited to add one or more target areas before being tailored to different audience. Then at a later stage, these specific areas are replaced by alternate images appropriate to specific viewer groups or geographical regions. For example, billboards at a ground or around of a major sporting event are qualified to be specific areas, and these target areas are electronically substituted by alternate images that are more appropriate for a particular country or region. In particular, such a system is useful to create multiple television feeds each having different electronically generated advertisement content which is tailored according to an intended audience.

With the advent of the individual video experience, this concept has been refined up to the individual video stream. However, at the production side, it is simply not possible to produce a large number of video feeds tailored for each user.

A known solution is to add a description file to the video feed, this description file indicating the location, orientation, size of the editable objects. This solution raises the problem of the compatibility with existing systems since this file should be bound with the video stream such as a proprietary sub-stream. A lot of systems along the line from the server to the target device are not suitable to accommodate this type of transmission and this solution is then reserved to a confidential audience for which the equipment was modified to accept this format.

SUMMARY

It is proposed a method to produce a modified video content from an original video content, wherein the method comprises:
   analyzing the original video content to detect at least one marker, said marker comprising a marker surface delimited by a marker identification,
   loading profile data of a user of a client module,
   determining, based at least on the profile data, a replacement content,
   adjusting the replacement content into the marker surface,
   replacing into the original video content the marker surface by the adjusted replacement content to produce the modified video content.

The present case is based on the recognition of a physical mark into a scene and to replace it by a selected ad content.

According to an aspect of the method, the marker identification may be in a form of a dotted line exhibiting a marker value, the analysis of the marker comprising the detection of the marker value from the marker identification;

According to another aspect of the method, the determination of the replacement content may be further based on the marker value.

According to another aspect of the method, the adjustment of the replacement content may comprise:
   determining the shape of the marker surface,
   comparing the shape of the marker surface with the shape of the replacement content,
   applying a morphing function to the replacement content so as to keep the perspective ratio while adjusting the replacement content to the marker surface.

According to another aspect of the method, the marker value may define a marker category, said marker category being used to determine the replacement content.

According to another aspect of the method, the modified content may be produced in a host device, and the replacement content may be preloaded into the host device.

According to another aspect of the method, the modified content may be produced in a client module, and the method may comprise:
   transmitting by the client module to a management center, a request comprising at least the marker identification and the profile data,
   determining by the management center, based on the marker identification and the profile data the replacement content,
   receiving by the client module from the management center the replacement content.

According to another aspect, the method may comprise:
   receiving by the management center, together with the request, a client identification,
   storing in a record related to the client identification, the marker value and a reference of the replacement content.

According to another aspect, the method may comprise:
   transmitting the modified content to the client module,
   receiving an interaction of the user in reference with the modified content,
   creating a snapshot of a current image of the modified content containing the replacement content,
   transmitting the snapshot, the user's interaction, and a client identification to a management center,
   detecting the replacement content from the current image and the user's interaction,
   recording, in a record related to the client identification, the interaction with the replacement content.

The present disclosure also proposes a client module configured to produce a modified video content from an original video content, said client module comprising,
   an input module for receiving the original content,
   a marker detector to detect at least one marker, said marker comprising a marker surface delimited by a marker identification,
   a profile matcher to load user's profile data,
   an image seeker to load, based at least on the profile data, a replacement content,
   a replacement module to adjust the replacement content into the marker surface and to replace into the original video content the marker surface by the adjusted replacement content to produce the modified video content.

According to another aspect of the client module, the replacement module may be further configured to:
   compare the shape of the marker surface with the shape of the replacement content, apply a morphing function to the replacement content so as to keep the perspective ratio while adjusting the replacement content to the marker surface.

SHORT DESCRIPTION OF THE FIGURES

The present application will be better understood thanks to the attached figures in which:

FIG. 1 illustrates a real environment for which an image is acquired

FIGS. 2, 3A, 3B and 4 are objects intended to carry ad content,

Figure 5:
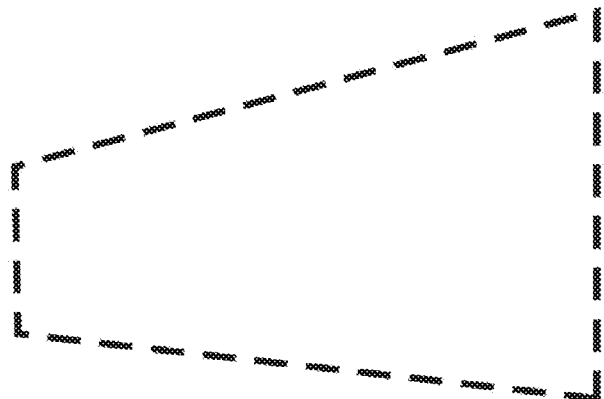
Figure 6:
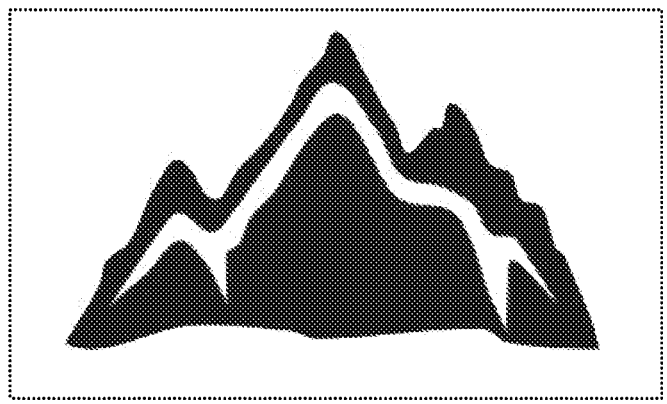
Figure 7:
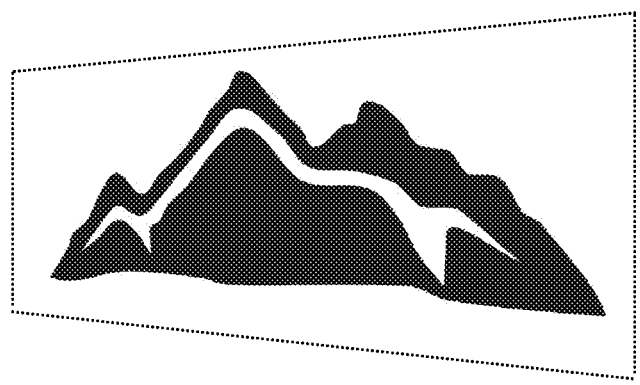
Figure 8:
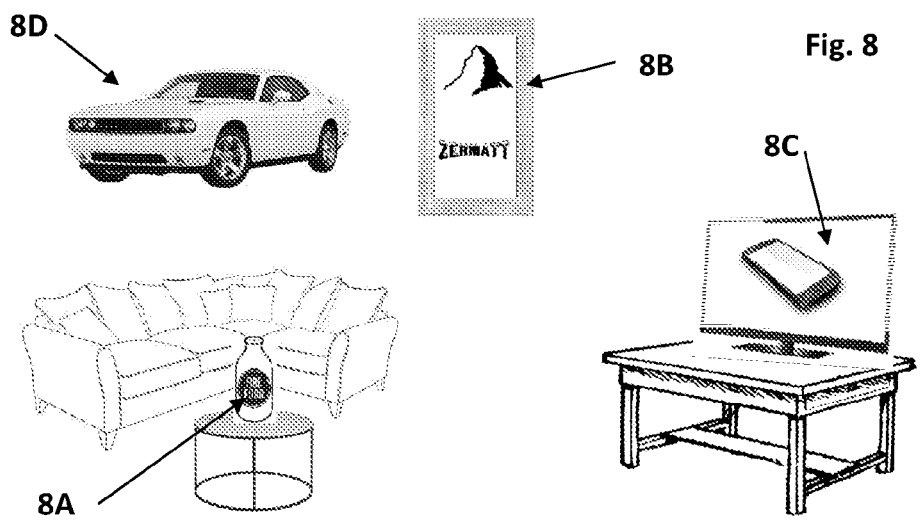
Figure 9:
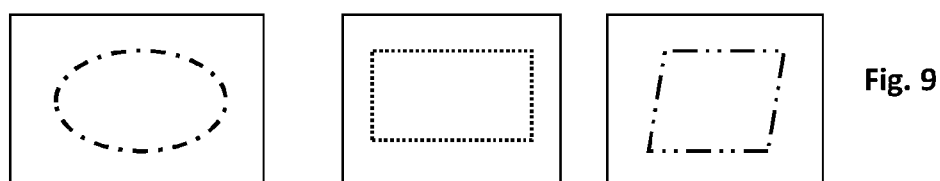
Figure 10:
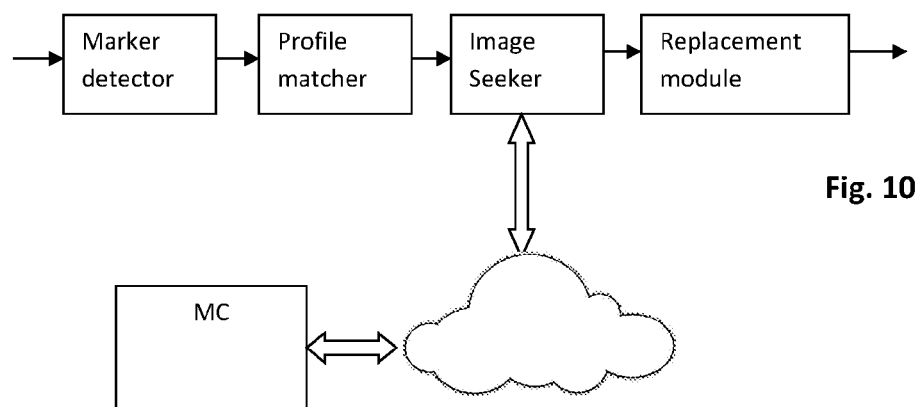
Figure 11:
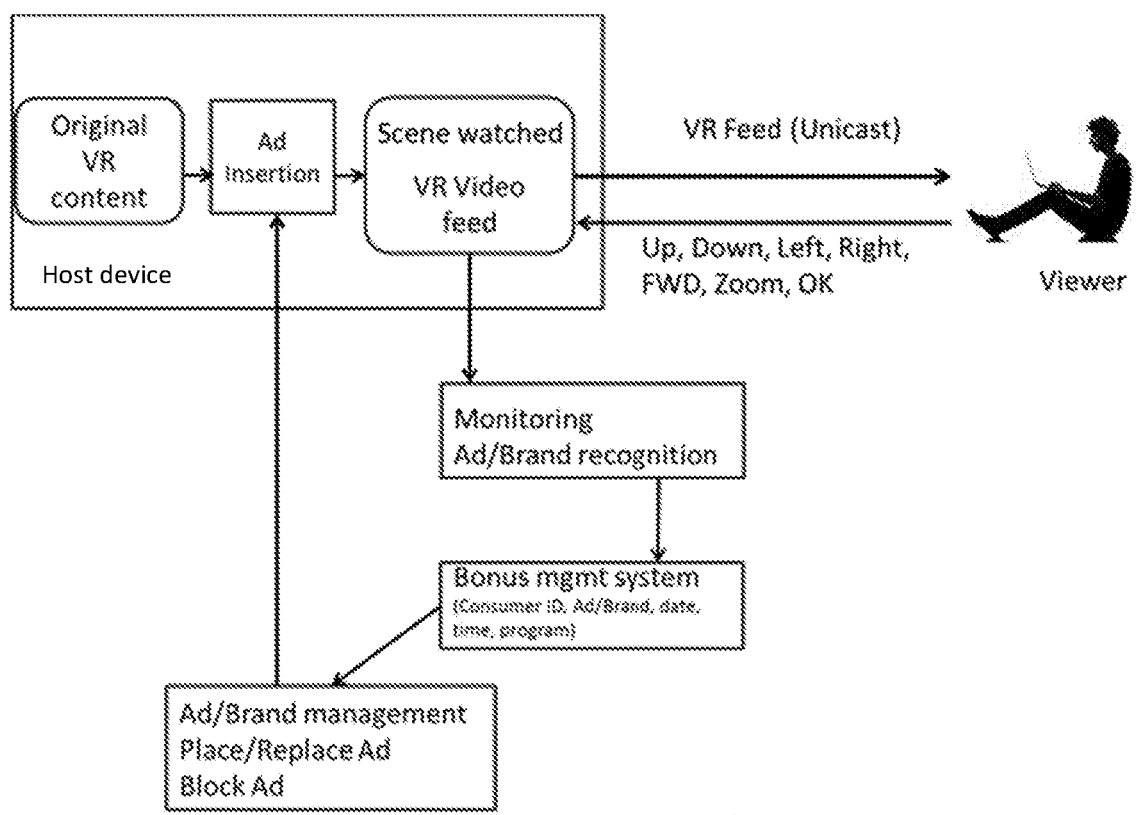
Figure 12:
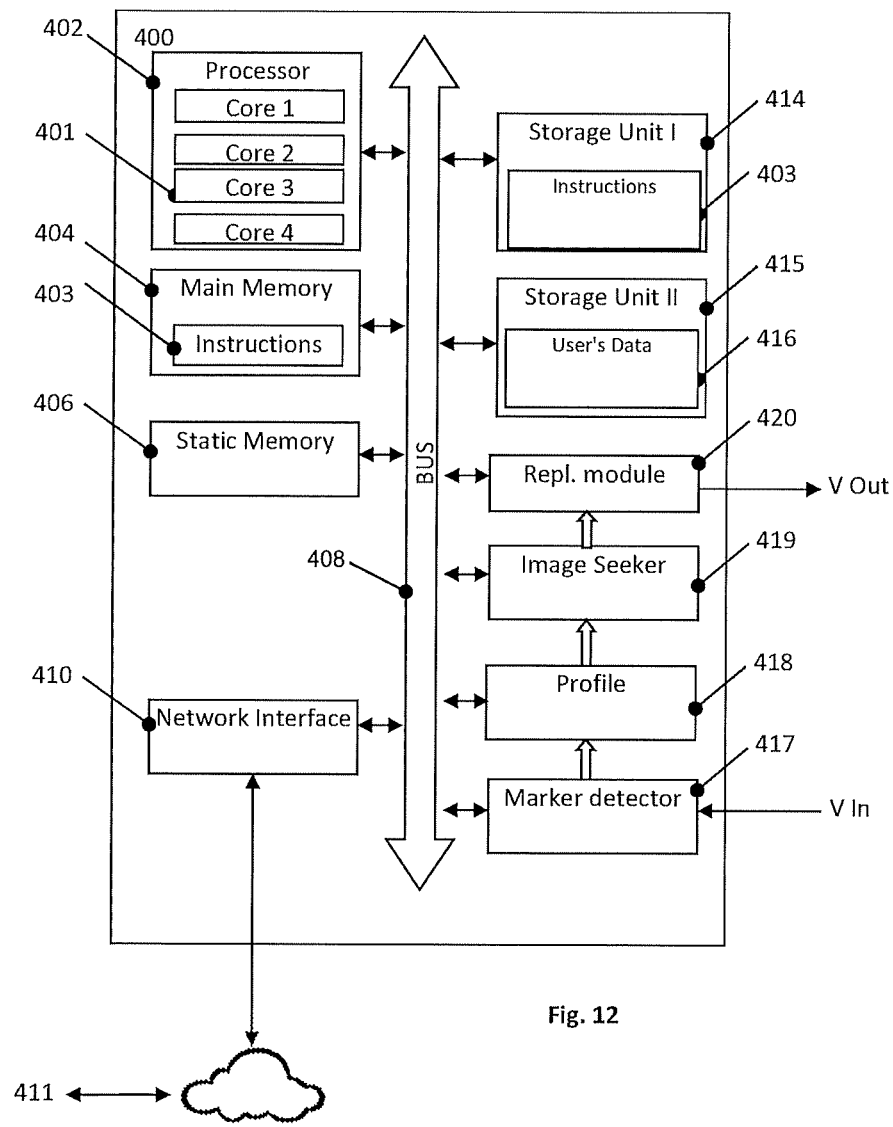

FIGS. 5, 6 and 7 illustrate the process of adjusting an image to the available frame, FIG. 8 shows the resulting image for a give user, FIG. 9 illustrates various examples of frames, FIG. 10 illustrates the modules involved in the transformation of the initial image to a modified image, FIG. 11 illustrates one embodiment with the interaction form the user, FIG. 12 is a block diagram illustrating components of a client module or Computing Device.

DETAILED DESCRIPTION

A first step of the method comprises identifying suitable surfaces for receiving ad content. In FIG. 1 are shown three objects 1A, 13 and 1C as well as a part of a wall 1D. Any surface could be used to embed ad content. A second step comprises creating markers, a marker being defined by a marker identification and a marker surface, said marker identification delimitating or surrounding the marker surface.

In FIG. 1, four markers are thus illustrated for potentially four ad contents. The marker's identification is placed around the marker's surface and has a particular pattern. A plain line is not suitable since many plain lines can be found in a natural environment. The marker's identification bears a recognizable pattern once the image is acquired.

In an example of FIG. 2, a bottle comprises a first image: a cow is for example represented, surrounded by a particular dotted line. This line is the marker's identification. In this example the marker's surface already comprises a first image. In the example 1D of FIG. 1, the marker's surface is bare or has the background of the whole scene.

FIG. 3A shows a marker's identification surrounding a black surface. The black surface may be for example a mirror as illustrated in FIG. 3B, a black board or a picture.

In FIG. 4, the marker's identification is placed on a screen.

It is to be noted that the marker's identification can be later identified and discriminated from natural lines surrounding a surface. Although the dotted line is a candidate for such a function, it is preferable that the line carries a plurality of bits of information repeated at least twice.

Example of dotted lines are:

A. — ·· — ·· — · — ··

B. — · — · — · — · — ·

C. — · — · — · — · — · —

The succession of short and long portions can exhibit information such as A: 11001100 . . . , B: 110110110 . . . or C: 10101010 . . . . This information is named marker's value.

FIG. 9 illustrates various example of the shape of the markers. A closed surface of any shape is surrounded by the marker's identification. The size has no importance; a marker can be placed on an advertisement covering a wall.

Different shapes or colors of the markers can be used to define any surface. For example, the marker could also be:

D. — ·· — · — · — · — · — · —

FIG. 10 illustrates the processing of a video signal into one device carrying out the ad content replacement method. This device is named a client module. Examples of client modules can be a smartphone or a tablet and in these examples, the video signal can be produced from the internal camera. The client module can be a rendering device such as a television, a VR headset, a computer. In this case, the video signal is received via a connection to a server.

Once the video signal is received, it is first analyzed with a Marker Detector module. This module scans the image to detect markers. In the example of FIG. 1, four markers are detected. The marker's identification is determined and the respective marker's value is calculated.

The marker's value defines the type of marker, such as for example the environment, the location, the ad category or the surface owner. This marker's value is sent to the profile unit in order to determine the replacement content. The profile unit comprises the user's preferences such as for example previous videos watched, age group, area of living, type of preferred goods etc. The profile data as well as the marker's value is sent to an Image Seeker module, in charge of retrieving the replacement content.

According to a first embodiment, the Image Seeker comprises a plurality of images ready for replacement. The device can upload several images based on the user's profile. The images are stored, for example in respect of a category. According to an example, a category is food or cars.

This category is compared with the marker's value from which a category can be extracted. The stored image matching the extracted category is selected and sent to the Replacement Module.

According to a second embodiment, the Image Seeker initiates a connection with a management center MC and communicates at least the marker's value to the management center. The Image Seeker can optionally communicate additional data such as the client identification, the profile data of the user, the location of the marker, the location of the device, the type of device or a user's identification, etc. The management center MC then determines, based on the marker's value, the appropriate replacement image. The replacement content can be an image or a video.

The replacement content is sent to the device for processing. For statistic purpose, the management center can keep track of the number of replacement requests as well as the marker's value and the additional data provided by the device.

Once the replacement content is received, the Replacement Module is in charge of processing the initial image and replacing the marker surface by the replacement content.

FIGS. 5 to 7 illustrate an example of the processing to insert the replacement content into the marker surface. FIG. 6 shows the replacement content as it is received from the management center MC. FIG. 5 shows the marker identification on an object or a wall. As an example, the television 1C of FIG. 1 is a good support for a marker.

In case that the shape of the marker identification and the replacement content is not the same, an adjustment is to be carried out. In an embodiment, a resize function is applied in order to adjust the marker surface with the replacement content.

In another embodiment, a morphing function as illustrated in FIG. 7 is executed on the replacement content so as to fit into the marker surface while keeping the same perspective.

The Marker Detector communicates with the Replacement Module to inform the latter of the location of the marker surface as well as the identification of the marker. The Replacement Module updates each image from the incoming video stream as long as the Marker Module produces the location data of the marker. The morphing function is applied not only once but each time the shape of the marker changes.

FIG. 8 illustrates a result of the Replacement Module: the Marker Module has produced 4 set of data, one per marker. Four replacement images have been received by the Image Seeker and provided to the Replacement Module.

In the example 8A, the cow on the bottle was replaced by another advertisement. In 8B, an advertisement for Zermatt replaces the black surface. The selection of this image is the result of the user's profile, which for example comprises sport and ski interest, and the marker category.

On the television screen, a replacement image with the portable phone was inserted. A morphing function was applied on the image received as replacement image so as to fit the shape of the marker. Concerning the element 8D, an image of a car was inserted in the background of the initial image at the location defined by the marker.

An application of the above method is the virtual visit of a town. The end user connects via a rendering device to a server and can navigate along the streets to enjoy the monuments or architectural constructions. In prior steps, some of the advertisement surfaces have been modified to add the marker identification surrounding the ad surface. The server embeds the modules described in reference to the FIG. 10 and automatically updates the physical advertisement by a virtual advertisement. The town as well as the advertisement contractor participating to such an experience has the possibility to adjust the advertisement proposed to the virtual visitor. Since the lifetime of an advertisement is short, as for a football match for example, and the virtual tour row data are produced once, the virtual advertisement has the advantage to be up-to date. It can be a specific advertisement for the virtual visitors or the currently displayed advertisement, taking into account that each advertisement surface comprises a marker indicating a marker value.

The replacement advertisement can be also tailored for the user currently enjoying the virtual tour, using its preferences or language. The virtual tour provider has the possibility to sell the advertisement surfaces individually for a given period. For that purpose, the client module, while requesting the virtual visit, can also transfer other information such as the client identification and the profile data.

In FIG. 11, the modified video is prepared in the client module. This client module can be a local device such as a PC or a set-top box or can be located in a remote location such as a head-end. The original VR content is received by the client module and the marker is detected and replaced by ad content, creating a modified VR content, i.e. a new scene. The modified VR content is then transmitted to the viewer rendering device. With a mouse, a joystick, a button on a VR helmet or simply on a touch screen the viewer can interact with the new scene. Once the viewer has detected ad content, he can acknowledge the ad content by clicking on the ad content, or anywhere on the new scene, for example if there is only one ad. The viewer's action can be a positive acknowledgment or a negative acknowledgment. The viewer can for example select a corresponding area or button to express his acknowledgement as "I like"/"I don't like". The viewer's device generates an image location corresponding to the location selected by the viewer on the new scene, and adds the client identification.

This information is sent to the management center MC in charge of detecting the ad content matching the received image location.

When the management center MC receives the replacement request from the Image Seeker of the host device, the request comprises the marker identification, the user's profile and a client identification. As already explained, the management center MC stores this information for accounting purpose.

When the management center MC receives a user's acknowledgment comprising the client identification, this identification is used to retrieve the replacement content for this specific client identification. With the location indication, the management center determines the ad content inserted into the modified video content or new scene. With an information as "like" or "dislike", the profile of said user can be updated and the updated profile will be used later to select the appropriate replacement content. The management center can record the user's interaction with the ad content and keep a credit account for said user. This credit can be later claimed against reduction on products or invitation to events etc.

According to an embodiment, the client module creates a snapshot of the image, or the new scene, transmitted to the user when the user acknowledges an ad content. The snapshot image and the image location indicated by the user are sent to the management center. The management center can then use the image location information to analyze the snapshot to detect the ad content.

The snapshot can be stored in the management center MC as a proof of the publication of the advertisement.

As shown is FIG. 12, a block diagram illustrating components of a client module or Computing Device 400, according to some example embodiments, is able to read instructions from a machine-readable medium (e.g., a machine-readable storage medium) and perform any one or more of the methodologies discussed herein. Specifically, FIG. 12 shows a diagrammatic representation of the Computing Device 400 in the example form of a computer system and within which instructions 403 (e.g., software, a program, an application, an applet, an app, or other executable code) for causing the Computing Device 400 to perform any one or more of the methodologies discussed herein may be executed. In alternative embodiments, the Computing Device 400 operates as a standalone device or may be connected (e.g., networked) to other machines. In a networked deployment, the Computing Device 400 may operate in the capacity of a server machine or a client machine in a server-client network environment, or as a peer machine in a peer-to-peer (or distributed) network environment. The Computing Device 400 may be a server computer, a client computer, a personal computer (PC), a network router, a network switch, a network bridge, or any machine capable of executing the instructions 403, sequentially or otherwise, that specify actions to be taken by that machine. Further, while only a single machine is illustrated, the term "machine" shall also be taken to include a collection of machines that individually or jointly execute the instructions 403 to perform any one or more of the methodologies discussed herein.

The Computing Device 400 includes a processor 402 (e.g., a central processing unit (CPU), a digital signal processor (DSP), an application specific integrated circuit (ASIC), or any suitable combination thereof), a main memory 404, and a static memory 406, which are configured to communicate with each other via a bus 408. The processor 402 can be a single chip or a multi-core processor (Core 1 . . . Core 4). The Computing Device 400 may further include a Network Interface 410 in communication with other external devices.

The Computing Device 400 includes a first storage unit I 414 on which is stored the instructions 403 embodying any one or more of the methodologies or functions described herein. The instructions 403 may also reside, completely or at least partially, within the main memory 404, within the processor 402 (e.g., within the processor's cache memory), or both, during execution thereof by the Computing Device 400. Accordingly, the main memory 404 and the processor 402 may be considered as machine-readable media. The Computing Device 400 further contain a second storage unit II 415 on which is stored the User's Data 416. One example of the User's Data is the user's identification UserID and the profile data used to select the replacement content.

The Computing Device 400 comprises various modules to produce the modified video content from the original video content. The original video content is received by the video input V In (or acquired through a camera) and processed by the Computing device. As explained above, the Computing Device comprises a Marker detector module 417, a Profile Module 418, a Image Seeker module 419 and an Replacement Module 419 for producing the modified video content V Out.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the storage unit 414, 415 is shown in an example embodiment to be a single medium, the term "storage unit" should be taken to include a single medium or multiple media (e.g., a centralized or distributed database, or associated caches and servers) able to store instructions.

The instructions 403 may further be transmitted or received over a communications network 409 or 411 using a transmission medium via the network interface device 410 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions for execution by the machine 400, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The invention claimed is:

1. A computing device to produce a modified video content from an original video content, the computing device comprising:
    at least one processor;
    a marker detector module configured to detect, from the original video content, at least one marker, the at least one marker comprising a marker surface surrounded by a marker identification, and to determine a marker value from the marker identification;
    at least one memory to store a plurality of replacement contents;
    an extraction module, to determine a replacement content based on the marker value; and
    a replacement module configured to replace the marker surface of the original video content with the replacement content to produce the modified video content.

2. The computing device of claim 1, wherein the replacement module is further configured to adjust the replacement content based on the marker surface.

3. The computing device of claim 2, wherein the replacement module is further configured to:
    determine a shape of the marker surface;
    compare the shape of the marker surface with a shape of the replacement content; and
    apply a morphing function to the replacement content to keep a perspective ratio while adjusting the replacement content to correspond to the marker surface.

4. The computing device of claim 1, wherein the marker identification exhibits a binary marker value that is decodable.

5. The computing device of claim 1, wherein the marker identification is in a form of a dotted line exhibiting a marker value.

6. The computing device of claim 1, wherein the request comprises a user's profile.

7. The computing device of claim 1, wherein the computing device is further configured to:
    transmit the modified video content to a client module;
    receive a snapshot of a current image of the modified video content containing the replacement content from the client module;
    receive an interaction of a user in reference with the modified video content from the client module;
    transmit the snapshot, the interaction of the user, and a client identification to a management center;
    detect the replacement content from the current image and the interaction of the user; and
    record, in a record related to the client identification, the interaction with the replacement content.

8. The computing device of claim 1, wherein the marker value defines a marker category, the marker category being used to determine the replacement content.

9. The computing device of claim 7, wherein the management center is further configured to:
    receive, a request and a client identification; and
    store in a record related to the client identification, the marker value and a reference of the replacement content.

10. A method for producing a modified video content from an original video content, the method comprising:
    providing the original video content to a computer device;
    detecting, by processing the original video content at the computer device, in the original video content at least one marker, the at least one marker comprising a marker surface surrounded by a marker identification, and determining a marker value from the at least one marker;

providing a plurality of replacement contents at the computer device;
determining a replacement content based on the determined marker value; and
replacing the marker surface of the original video content with the replacement content to produce the modified video content.

11. The method of claim 10, wherein replacing the marker surface of the original video content with the replacement content comprises adjusting the replacement content based on the marker surface.

12. The method of claim 10, wherein replacing the marker surface of the original video content with the replacement content further comprises:
determining a shape of the marker surface;
comparing the shape of the marker surface with a shape of the replacement content; and
applying a morphing function to the replacement content to keep a perspective ratio while adjusting the replacement content to correspond to the marker surface.

13. The method of claim 10, wherein the method further comprises:
loading profile data of a user;
determining, based at least on the profile data and the marker value, a replacement content;
adjusting the replacement content into the marker surface; and
replacing the marker surface of the original video content by the adjusted replacement content to produce the modified video content.

14. The method of claim 13, wherein the modified video content is produced in a client device, and wherein the method further comprises:
transmitting by the client device to a management center, a request comprising at least the marker identification and the profile data;
determining by the management center, based on the marker identification and the profile data, the replacement content; and
receiving by the client device from the management center the replacement content.

* * * * *